(12) United States Patent
Son

(10) Patent No.: US 7,578,417 B2
(45) Date of Patent: Aug. 25, 2009

(54) AIRLESS TYPE COSMETIC CONTAINER WITH QUANTIFIED CONTENTS DISCHARGING, CONTENTS LEAKAGE PREVENTING AND CONTENTS DETERIORATION PREVENTING FUNCTIONS

(75) Inventor: Dae Sik Son, Masan (KR)

(73) Assignee: Darin Co., Ltd., Masan-si, Kyungnam (KR)

( * ) Notice: Subject to any disclaimer, the term of this patent is extended or adjusted under 35 U.S.C. 154(b) by 444 days.

(21) Appl. No.: 11/639,952

(22) Filed: Dec. 15, 2006

(65) Prior Publication Data

US 2007/0164053 A1    Jul. 19, 2007

(30) Foreign Application Priority Data

Jan. 18, 2006    (KR) ...................... 10-2006-0005262

(51) Int. Cl.
*G01F 11/00* (2006.01)
(52) U.S. Cl. ....................................... 222/257; 222/340
(58) Field of Classification Search ................. 222/257, 222/340, 341, 321.1, 321.7, 321.9, 378–380, 222/384, 387, 183.1, 383.1, 207
See application file for complete search history.

(56) References Cited

U.S. PATENT DOCUMENTS

| 5,152,434 | A | * | 10/1992 | Birmelin ...................... 222/207 |
| 5,819,990 | A | * | 10/1998 | Cimentepe et al. ........... 222/207 |
| 6,371,333 | B2 | * | 4/2002 | Lorscheidt et al. ........ 222/321.9 |
| 6,681,962 | B2 | * | 1/2004 | Masuda .................... 222/321.7 |
| 6,880,731 | B2 | * | 4/2005 | Heukamp ................. 222/321.7 |
| 6,926,175 | B2 | * | 8/2005 | Choi et al. ............... 222/321.7 |
| 6,955,278 | B2 | * | 10/2005 | Lorscheidt .................. 222/320 |

FOREIGN PATENT DOCUMENTS

| KR | 10-1999-0066973 | 8/1999 |
| KR | 20-0294062 | 10/2002 |
| KR | 10-2005-0050781 | 6/2005 |

* cited by examiner

*Primary Examiner*—Lien T Ngo
(74) *Attorney, Agent, or Firm*—John K. Park; Park Law Firm

(57) ABSTRACT

Disclosed herein is an airless type cosmetic container that receives various kinds of cosmetics and that is capable of discharging a fixed quantity of contents received therein by a pumping operation, preventing the leakage of contents, and preventing the deterioration of contents. The cosmetic container is constructed in a structure in which a first valve member is fixed to the inner lower part of a cylinder formed in a housing member, the first valve member is integrally formed with a contents opening and closing member for opening and closing a contents introduction hole, an elastic flat plate part, and a vertical guide rod, a quantified contents discharging support protrusion is disposed at the piston shaft, and a nozzle hole opening and closing member is disposed in a nozzle hole.

10 Claims, 10 Drawing Sheets

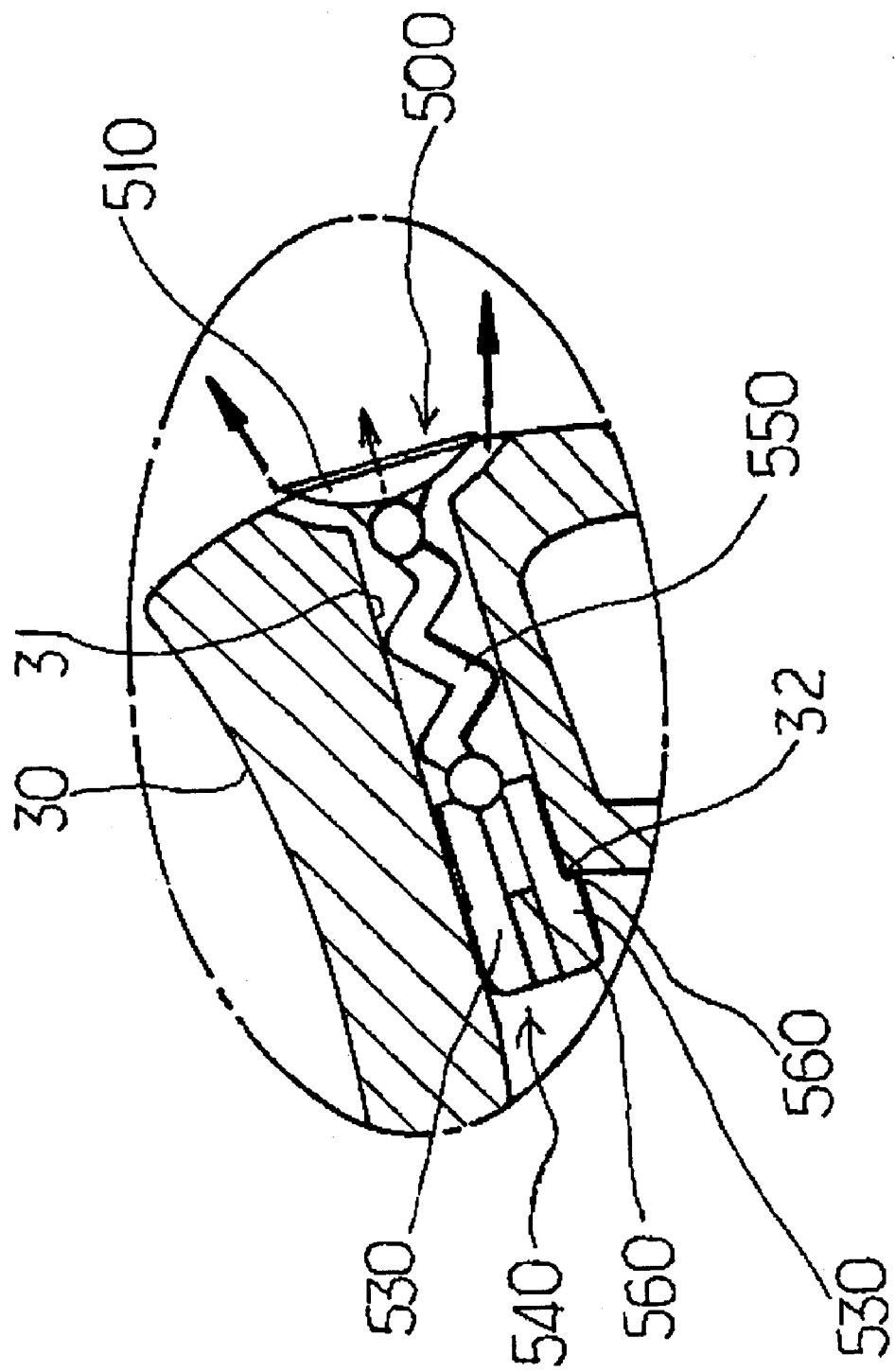

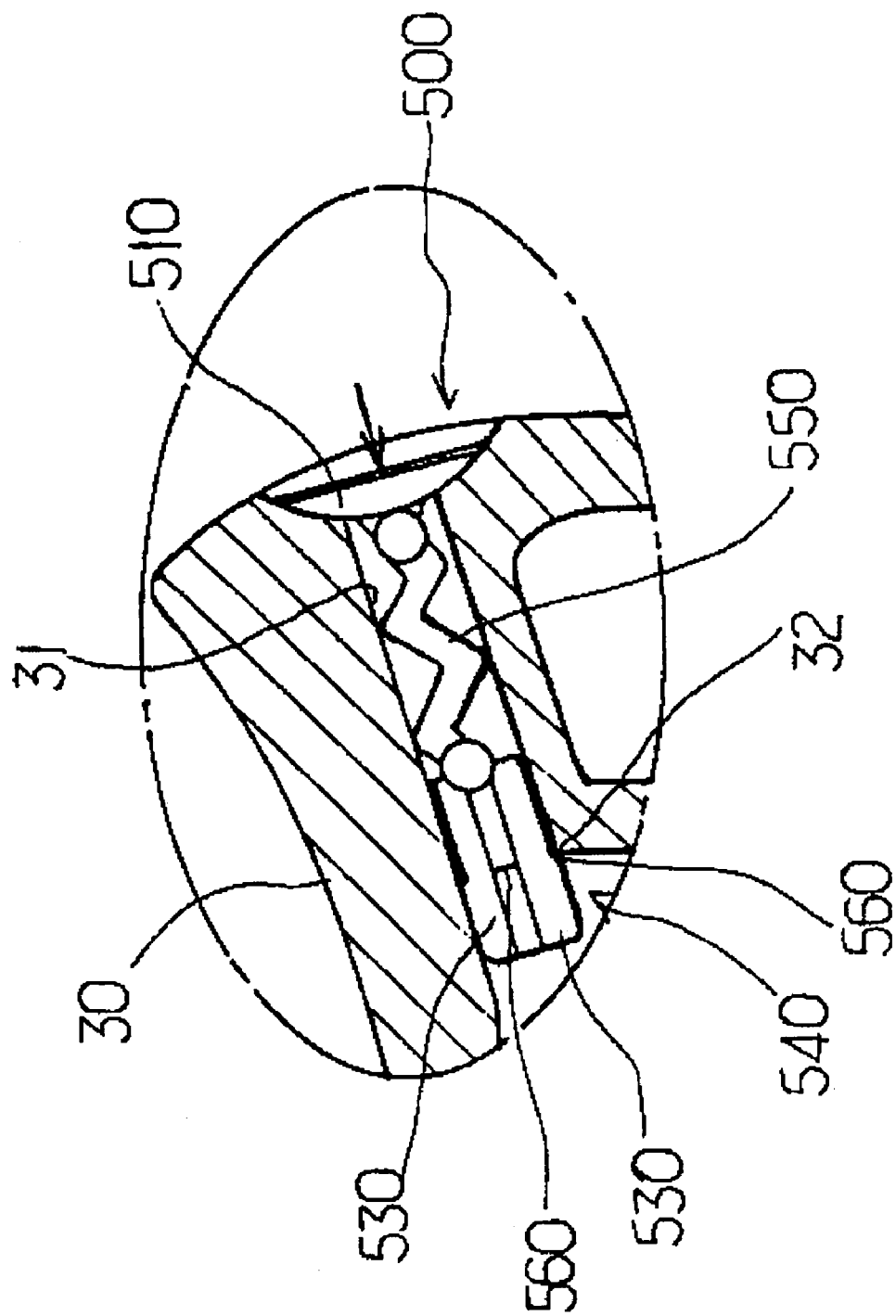

AIRLESS TYPE COSMETIC CONTAINER WITH QUANTIFIED CONTENTS DISCHARGING, CONTENTS LEAKAGE PREVENTING AND CONTENTS DETERIORATION PREVENTING FUNCTIONS

CLAIMING FOREIGN PRIORITY

The applicant claims and requests a foreign priority, through the Paris Convention for the Protection of Industrial Property, based on patent applications filed in the Republic of Korea (South Korea) with the filing date of Jan. 18, 2006 with the patent application number 10-2006-0005262 by the applicant, the contents of which are incorporated by reference into this disclosure as if fully set forth herein.

BACKGROUND OF THE INVENTION

1. Field of the Invention

The present invention relates to a nozzle lowering type cosmetic container that is capable of discharging various liquefied cosmetics received therein, and, more particularly, to an airless type cosmetic container that is capable of discharging a fixed quantity of contents received therein, preventing the leakage of contents, and preventing the deterioration of contents.

The cosmetic container according to the present invention adopts a structure in which a housing member is lowered in a contents receiving vessel by the amount of contents discharged from the contents receiving vessel, whereby the interior of the contents receiving vessel is always maintained airless. Consequently, it is possible for the cosmetic container to prevent the introduction of foreign matter and to guarantee the long-term preservation of the contents. Furthermore, the cosmetic container according to the present invention has a first sealing function accomplished by a first valve member and a second sealing function accomplished by a nozzle hole opening and closing member, whereby the preservation effect of the contents is further improved. In addition, the lowering distance of a piston, which pumps the contents, is maintained constant, whereby it is possible for the cosmetic container to discharge a fixed quantity of contents.

2. Description of the Related Art

High-function cosmetics, which have been placed on the market in large quantities recently, use natural raw materials at a high rate. In addition, the use of an antiseptic is restricted to the highest degree. As a result, the decomposition or the acidification rate of the cosmetics is highly increased. This problem is generated due to deficient structure of cosmetic containers and introduction of external air and foreign matter into the containers.

For high-priced high-function cosmetics, on the other hand, it is required to use a fixed quantity of cosmetics. In the case that the discharging structure of a pump dispenser type cosmetic container is constructed in a structure in which a nozzle is lowered, however, the lowering distance of the nozzle is not uniform when the nozzle is pressed so as to discharge contents received in the container. As a result, the amount of the discharged contents is not uniform. Consequently, the contents are excessively discharged at a time, and therefore, the discharge contents are unnecessarily consumed. Otherwise, the amount of the discharged contents is too small, and therefore, an additional contents discharging operation is required.

In the past, there were proposed pump dispenser type cosmetic containers having various structures to discharge a fixed quantity of contents and prevent the decomposition or the acidification of the contents.

Korean Patent Application Publication No. 1999-0066973 discloses "Dispenser for liquid or pasty materials" (hereinafter referred to as Related art 1).

Related art 1 discloses a structure in which contents received in a container is sealed by a sealing piston in a housing, a nozzle button and the sealing piston are connected with a discharging tube, which is integrally formed with the nozzle button, and the discharging tube is fitted in a nozzle hole of the nozzle button. When the nozzle button is pressed, the sealing piston is lowered to pressurize the contents. As a result, the contents are introduced into the discharging tube, and the contents are discharged out of the container as the discharging tube is opened.

In Related art 1, however, a sealing member is connected with the discharging tube, which is integrally formed with the nozzle button. As a result, the lowering distance is not uniform when the nozzle button is pressed. Consequently, it is not possible to discharge a fixed quantity of contents. Furthermore, the discharging valve is fitted in only the nozzle hole of the nozzle button. As a result, the sealing effect is greatly reduced.

Korean Utility Model Registration No. 20-0294062 discloses "a contents receiving structure of an airless pump type cosmetic container" (hereinafter referred to as Related art 2).

Related art 2 discloses a structure in which contents received in a container is sealed by a compressing piston, and a nozzle button is connected to a valve rod fitted in the compressing piston. When the nozzle button is pressed, the valve rod fitted in the compressing piston is lowered. As a result, the contents are discharged through the valve rod. Consequently, the sealing function is decreased, and it is not possible to discharge a fixed quantity of contents.

Korean Patent Registration No. 10-0525455 discloses "a quantified contents discharging structure of a nozzle button lowering type vacuum cosmetic container" (hereinafter referred to as Related art 3).

Related art 3 discloses a structure in which a nozzle button is connected with a central shaft of a sealing piston member, an opening and closing part is formed in the lower end of the central shaft, a liquid introduction hole is formed above the opening and closing part, and an elastic pumping member is fitted on the inner circumferential wall of the liquid introduction hole. When the nozzle button is pressed, the central shaft is lowered to close the liquid introduction hole, and the pumping member is widened to open the liquid introduction hole, whereby the contents are discharged out of the container. However, the opening and closing part, which serves as a first valve, is always opened while being raised by a nozzle button return spring. As a result, the contents in the container communicate with contents in a liquid collection chamber, and therefore, the contents in the liquid collection chamber is reintroduced into the container until the central shaft is lowered and the liquid introduction hole is closed by the opening and closing part formed at the lower end of the central shaft. Furthermore, the nozzle button is maintained in a sealed state only by the pumping member while the nozzle button is raised. As a result, the decomposition or acidification rate of the contents due to introduction of external air or foreign matter is considerably increased.

In most of the pump dispenser type cosmetic containers, including the nozzle button lowering type cosmetic containers, on the other hand, it is necessary to use an additional chaplet when assembling the nozzle button and the housing member, which is a factor that complicates the assembly process and increases the manufacturing costs.

SUMMARY OF THE INVENTION

Therefore, the present invention has been made in view of the above problems, and it is an object of the present invention to provide an airless type cosmetic container that is capable of discharging a fixed quantity of contents received therein, preventing the leakage of contents, and preventing the deterioration of contents.

In accordance with the present invention, the above and other objects can be accomplished by the provision of an airless type cosmetic container constructed in a structure in which a nozzle button and a housing are directly assembled with each other in a simple fashion, a first valve member mounted in a contents introduction hole, through which contents are introduced from the container, is directly fixed in a housing, a second valve rod is vertically moved while the vertical state of the second valve rod is maintained, a guide hole is formed in the second valve rod, a guide rod protruding from the central part of an opening and closing part of a second valve member is moved along the guide hole such that appropriate friction is accomplished between friction ribs and the guide hole, a support protrusion is disposed at the inner surface of the lower part of a pumping piston shaft such that the support protrusion is caught by the upper end of the first valve member, and therefore, the pumping piston shaft is prevented from being lowered more than a predetermined distance so as to discharge a fixed quantity of contents, an opening and closing part of the first valve member automatically closes a liquid introduction hole by an elastic surface, when the nozzle button is pressed, a second valve rod support rib in the nozzle button presses the upper end of the second valve member with the result that the vertical guide rod of the first valve member fitted in the lower end of the second valve member presses a contents opening and closing member, thereby further improving a sealing function, and a nozzle hole opening and closing member having a simple structure is fixedly fitted in a nozzle hole of the nozzle button, thereby preventing the introduction of external air or foreign matter.

BRIEF DESCRIPTION OF THE DRAWINGS

The above and other objects, features and other advantages of the present invention will be more clearly understood from the following detailed description taken in conjunction with the accompanying drawings, in which:

FIG. 9 is an enlarged sectional view of the nozzle hole opening and closing member according to the present invention when the nozzle hole opening and closing member is opened; and FIG. 10 is an enlarged sectional view of the nozzle hole opening and closing member according to the present invention when the nozzle hole opening and closing member is closed.

DESCRIPTION OF THE PREFERRED EMBODIMENTS

Figure 1:
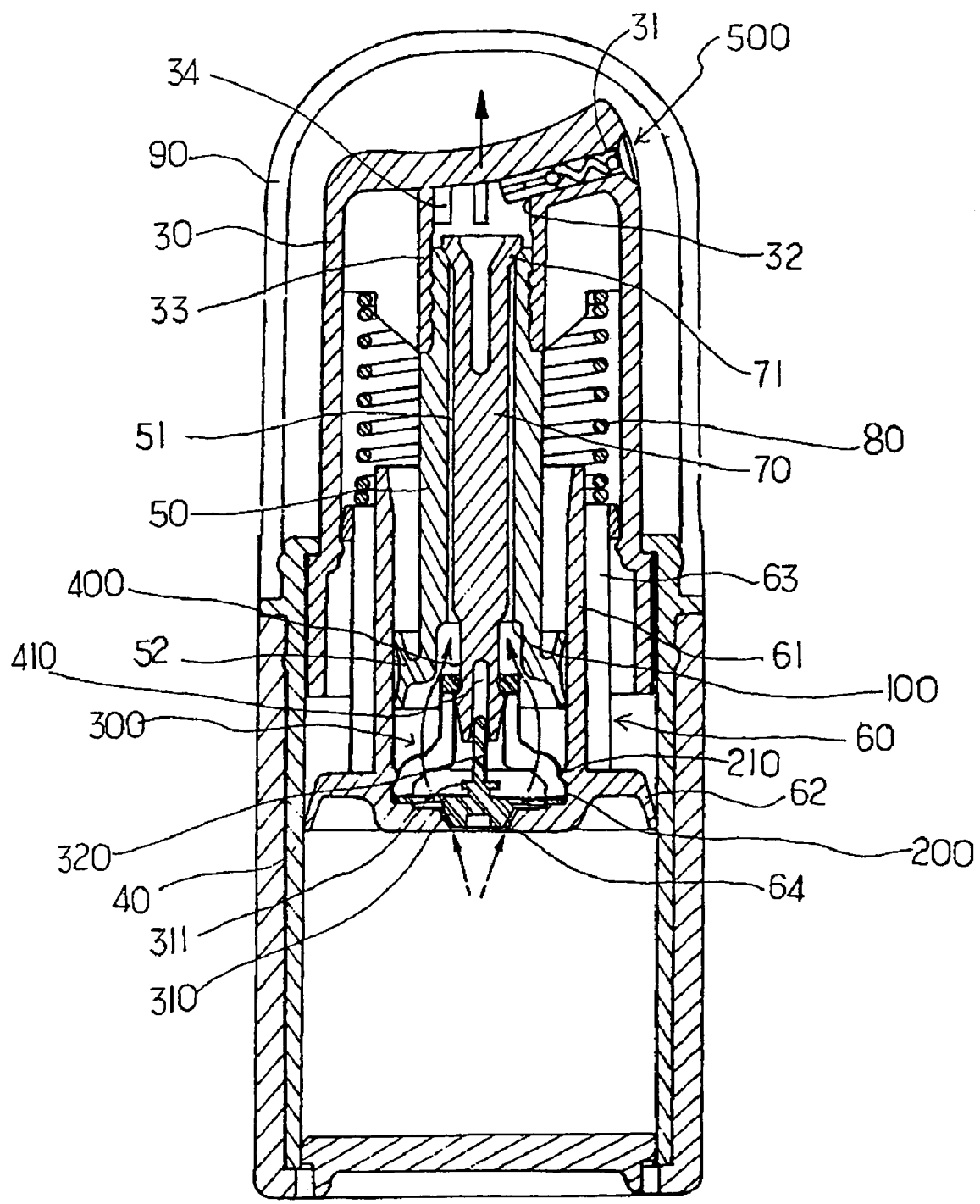
FIG. 1 is a longitudinal sectional view of a cosmetic container according to the present invention illustrating contents introduced into a piston cylinder as a nozzle button is raised.

Now, a preferred embodiment of the present invention will be described in detail with reference to the accompanying drawings.

Referring to the drawings, an airless type cosmetic container includes a nozzle button 30. The nozzle button 30 has a nozzle hole 31, through which contents are discharged, the nozzle hole 31 being provided with a step part 32 formed at the inner surface thereof, a piston shaft connection part 33 disposed in the central part thereof, and a second valve rod support rib 34 also disposed in the central part thereof. The airless type cosmetic container further includes a contents receiving vessel 40, in the upper part of which the nozzle button 30 is fitted, and a piston shaft 50 fixedly fitted in the piston shaft connection part 33. The piston shaft 50 has a contents communication hole 51 defined therein and a pumping piston 52 integrally formed at the lower part thereof. The airless type cosmetic container further includes a housing member 60. The housing member 60 has a cylinder 61, in which the pumping piston is fitted, a contents sealing rib 62 formed at the circumferential wall of the lower part of the cylinder 61, a plurality of vertical reinforcing ribs 63 formed at the outer circumferential wall of the cylinder 61, and a contents introduction hole 64 formed in the bottom surface of the cylinder 61. The airless type cosmetic container further includes a second valve rod 70 fitted in the contents communication hole 51 of the piston shaft 50. The second valve rod 70 has a tapered opening and closing part 71 formed at the upper end thereof. The airless type cosmetic container further includes a nozzle button return spring 80 disposed between the housing member 60 and the nozzle button 30. The airless type cosmetic container according to the present invention is characterized by a quantified contents discharging support protrusion 100 disposed at the inner surface of the lower part of the contents communication hole 51 of the piston shaft 50, a first valve member location part 200 disposed at the inner bottom surface of the cylinder 61 of the housing member 60, a first valve member 300 fixed to the first valve member location part 200, the first valve member 300 being integrally formed with a contents opening and closing member 310 having a support surface 311 formed at the upper part thereof and a vertical guide rod 320 having friction ribs 321 protruding from opposite sides of the circumferential wall of the upper part thereof, a fitting part 400 disposed at the lower part of the second valve rod 70, the fitting part 400 is fitted in the first valve member 300 in such a manner that the fitting part 400 cannot be separated from the first valve member 300, a catching part 401 disposed at the lower part of the fitting part 400, a guide hole 410, in which the vertical guide rod 320 is fitted, and a nozzle hole opening and closing member 500 fitted in the nozzle hole 31 of the nozzle button 30, the nozzle hole opening and closing member 500 having a contents opening and closing function.

At the inner surface of the nozzle button 30 is formed a housing assembly protrusion 30a. At the upper ends of the vertical reinforcing ribs 63 formed at the outer circumferential wall of the housing member 60 is disposed a nozzle button assembly ring 60a, which is integrally formed with the vertical reinforcing ribs 63. The nozzle button assembly ring 60a has an inclined outer circumferential wall 60b and a catching protrusion 60c formed at the lower end of the inclined outer circumferential wall 60b.

At the first valve member location part 200 is formed a protruding rim 210, to which the first valve member 300 is fixedly located.

The first valve member 300 includes a separation preventing protrusion 330 formed at the outer circumference wall of the lower part thereof, an elastic flat plate part 340 for holding the contents opening and closing member 310, the elastic flat plate part 340 having a plurality of contents communication holes 350, a holder part 360 for holding the fitting part 400 of the second valve rod 70, and a contents discharge channel 370 formed in the circumferential wall of the member body of the first valve member 300.

The nozzle hole opening and closing member 500, which is fitted in the nozzle hole 31 of the nozzle button 30, includes an arc-shaped opening and closing plate 510, which is positioned at the outside part of the nozzle hole opening and closing member 500, a fixing part 540 having a cross-shaped plate member 530 formed with a plurality of liquid channels 520, the fixing part 540 being positioned at the inside part of the nozzle hole opening and closing member 500, an elastic contraction part 550 integrally connected between the opening and closing plate 510 and the fixing part 540, and an assembly fixing protrusion 560 formed at the outer wall of the plate member 530.

In the drawings, unexplained reference numeral 90 indicates an overcap.

Hereinafter, the operation of the airless type cosmetic container with the above-stated construction according to the present invention will be described.

As described above, the housing assembly protrusion 30a is formed at the inner surface of the nozzle button 30, the nozzle button assembly ring 60a is disposed at the upper ends of the vertical reinforcing ribs 63 formed at the outer circumferential wall of the housing member 60, the outer circumferential wall 60b of the nozzle button assembly ring 60a is inclined, and the catching protrusion 60c is formed at the lower end of the inclined outer circumferential wall 60b. Consequently, when the housing 60 is forcibly fitted into the nozzle button 30, the assembly of the housing 60 and the nozzle button is easily accomplished due to the elasticity of the nozzle button assembly ring 60a and the inclination of the outer circumferential wall 60b. In the assembled state, the catching protrusion 60c of the nozzle button assembly ring 60a is caught by the housing assembly protrusion 30a of the nozzle button 30. Consequently, the housing 60 is prevented from being separated from the nozzle button 30.

FIG. 1 is a longitudinal sectional view illustrating the nozzle button 30 raised by the nozzle button return spring 80 in the airless type cosmetic container according to the present invention. As the nozzle button 30 is raised, the piston shaft 50 assembled to the nozzle button 30 is also raised. As a result, contents are introduced into the cylinder 61 through the contents introduction hole 64 of the housing member 60 due to a suction force generated from the pumping piston 52. The aforementioned structure and operation are well known in the art.

Figure 6:
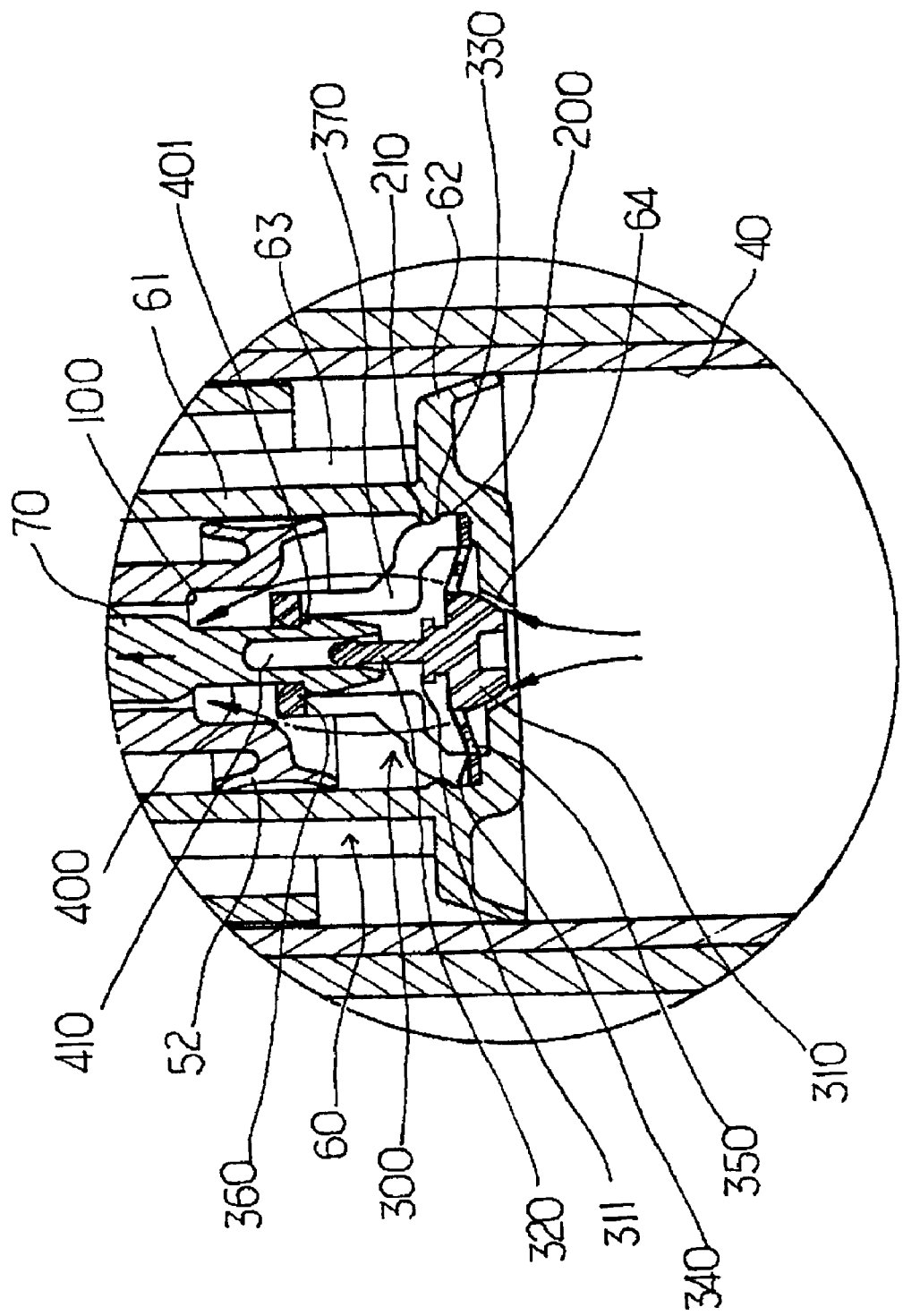
FIG. 6 is an enlarged sectional view of the first valve member according to the present invention when the first valve member is opened.
Figure 7:
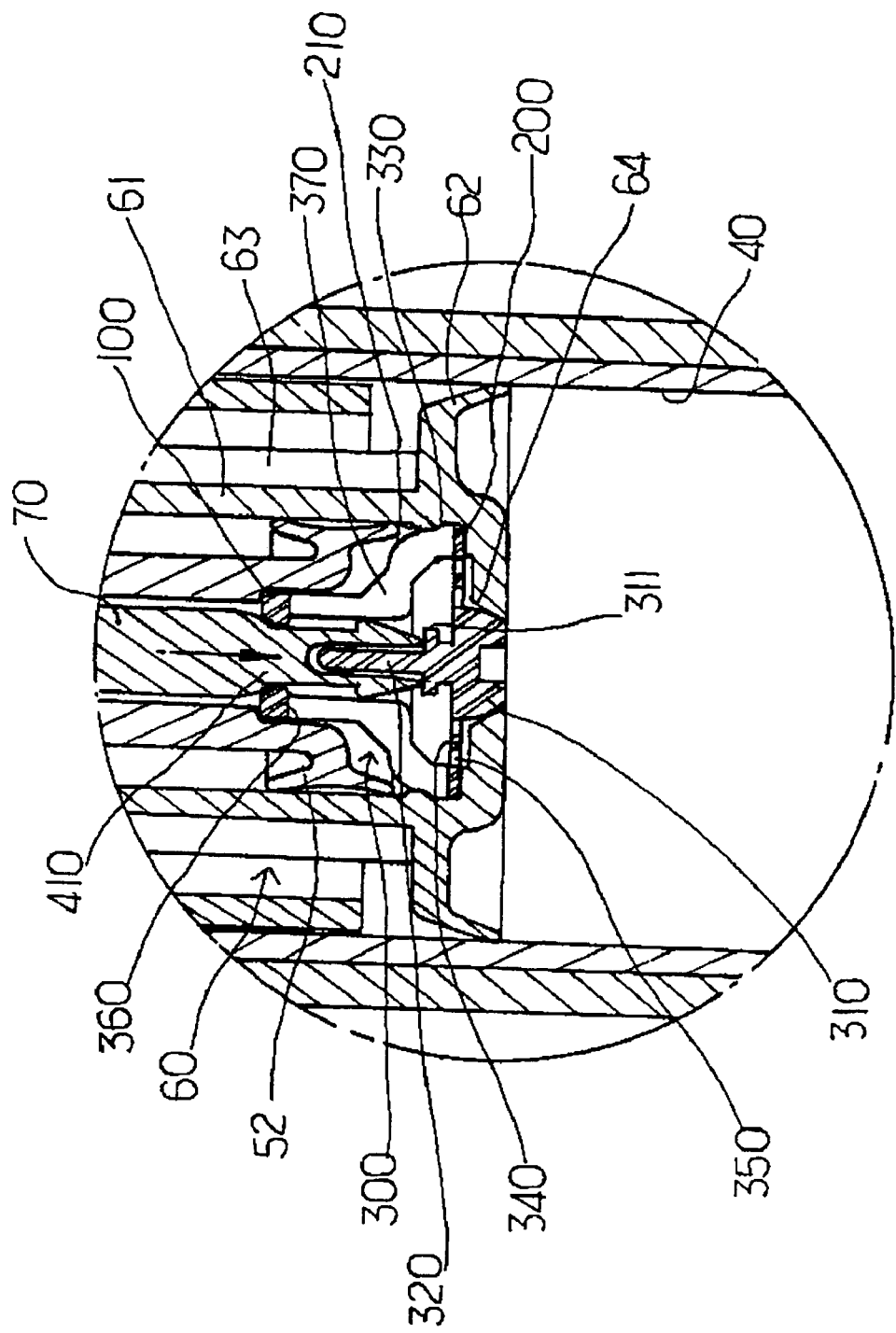
FIG. 7 is an enlarged sectional view of the first valve member according to the present invention when the first valve member is closed.
Figure 8:
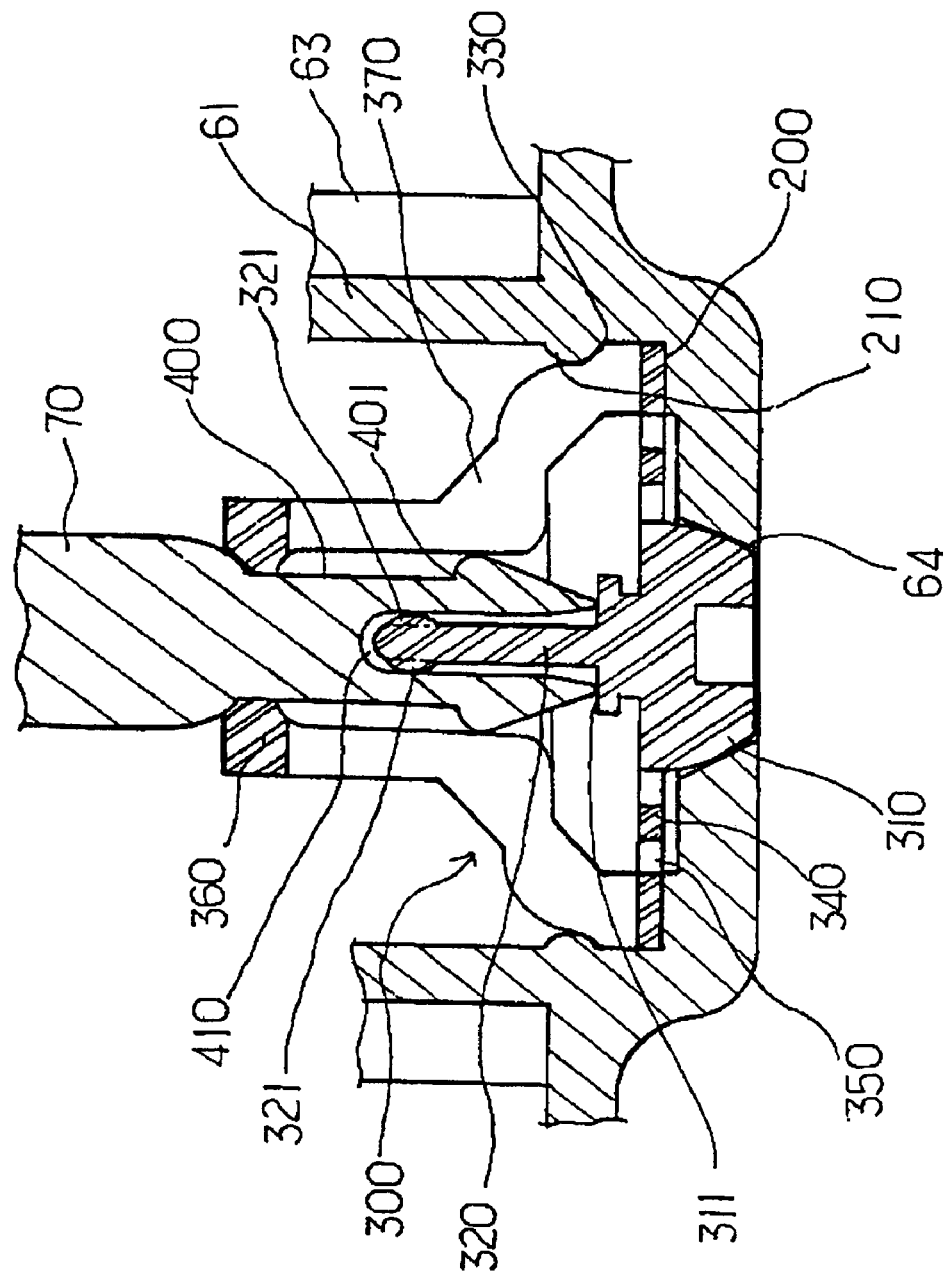
FIG. 8 is an enlarged sectional view illustrating the coupling between the first valve member and a second valve member according to the present invention.

When the suction force is generated from the pumping piston 52, the elastic flat plate part 340, which is integrally connected between the contents opening and closing member 310 and the first valve member 300, is raised with the result that the contents opening and closing member 310, which is integrally formed with the first valve member 300 and which is closing the contents introduction hole 64 due to vacuum pressure in the cylinder 61, is also raised, whereby the contents introduction hole 64 is opened (see FIG. 6).

As the contents opening and closing member 310 is raised, the contents in the contents receiving vessel 40 is introduced into the cylinder 61 through the contents introduction hole 64. When the upward movement of the nozzle button 30 is stopped, the interior pressure of the cylinder 61 is lowered. As a result, the elastic flat plate part 340, which is raised now, returns to its original position. Consequently, the contents opening and closing member 310, which is integrally formed with the elastic flat plate part 340, closes the contents introduction hole 64. At this time, the catching part 401 of the second valve rod 70 is caught by the holder part 360 of the first valve member 300. As a result, the upper-end opening and closing part 71 of the second valve rod 70 closes the contents communication hole 51 of the piston shaft 50, whereby the leakage of the contents is effectively prevented.

Figure 2:
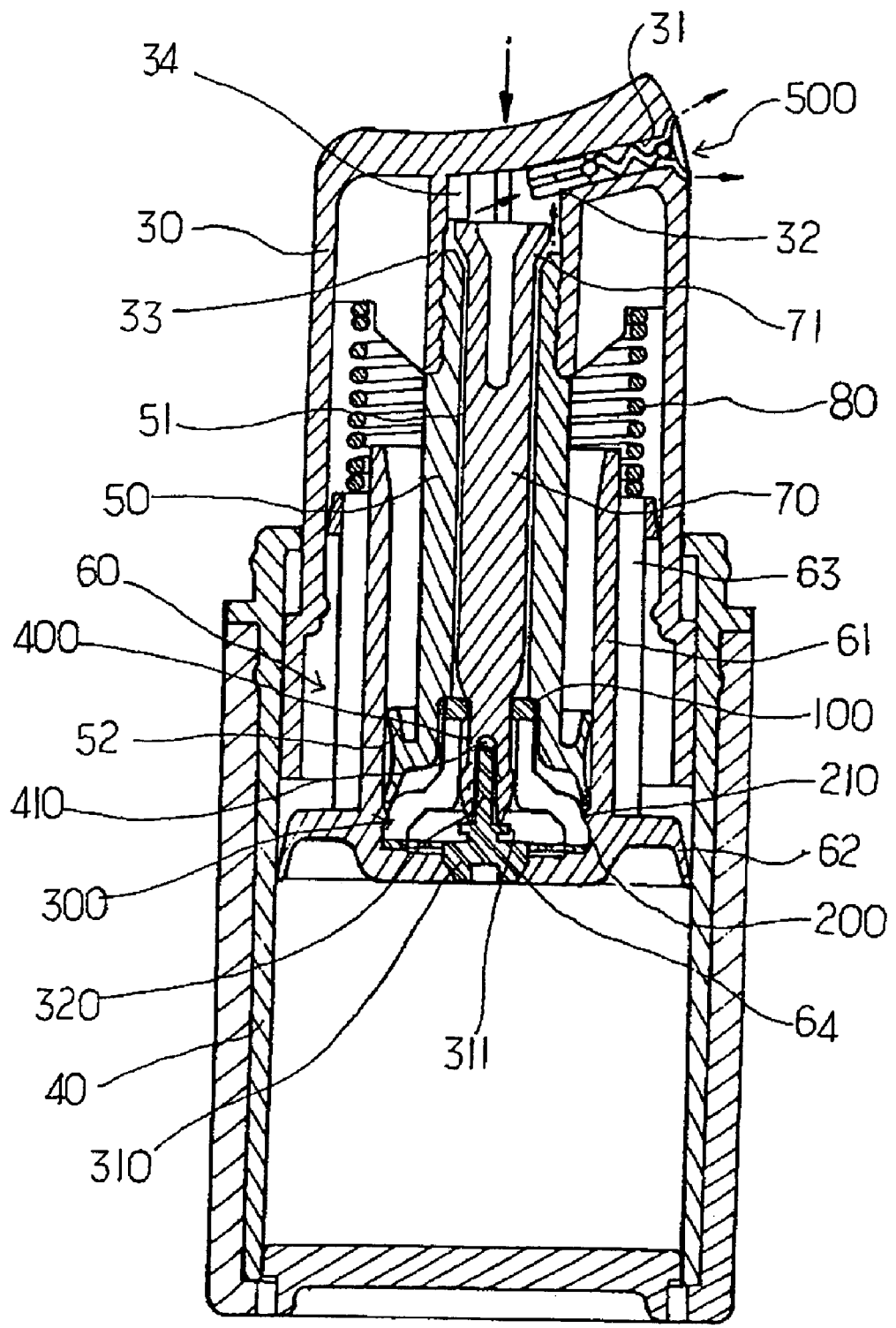
FIG. 2 is a longitudinal sectional view of the cosmetic container according to the present invention illustrating contents discharged out of the cosmetic container as the nozzle button is lowered.
Figure 3:
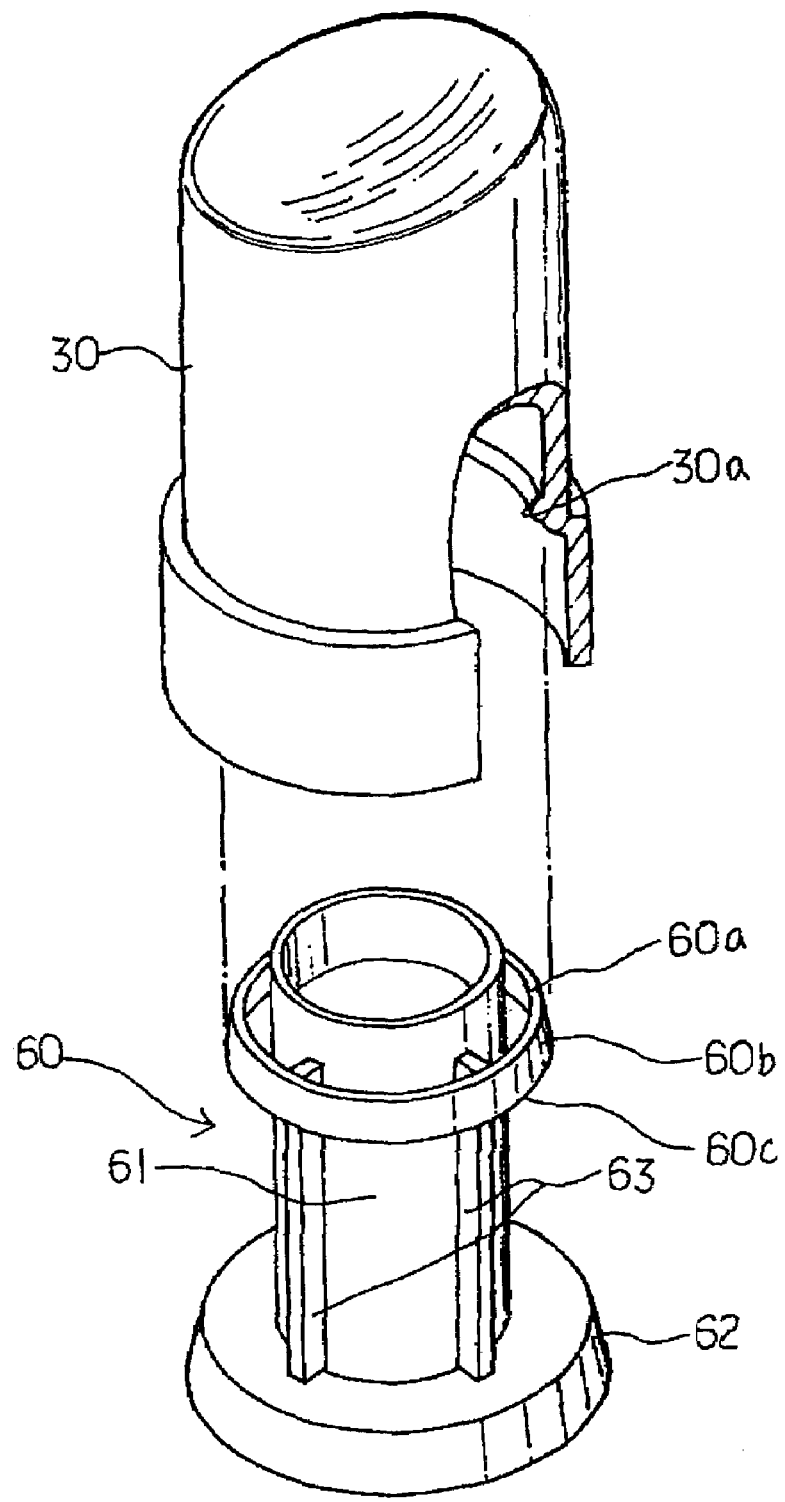
FIG. 3 is an exploded perspective view of the nozzle button and a housing member according to the present invention.
Figure 4:
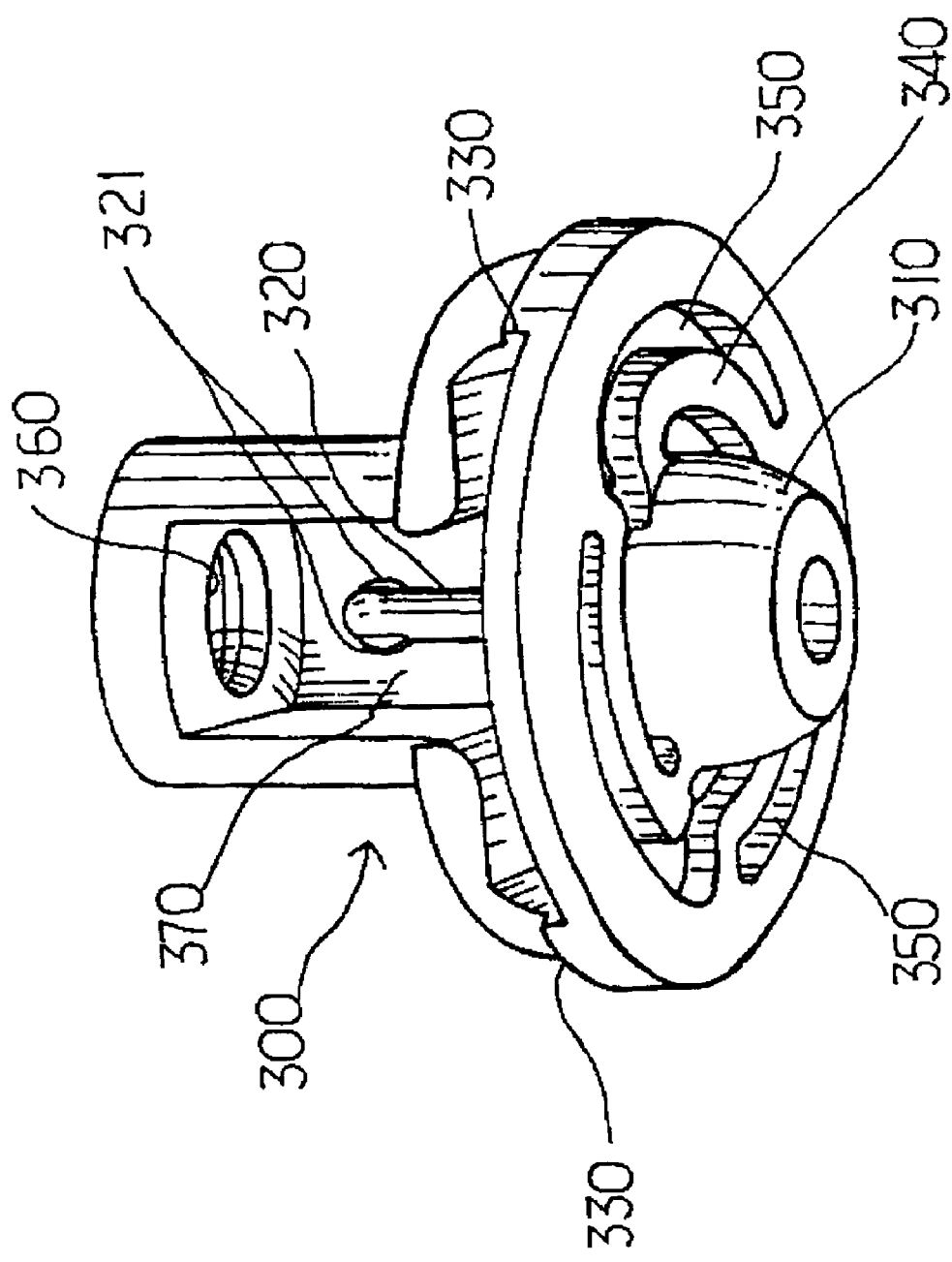
FIG. 4 is a perspective view of a first valve member, which is a principal component of the present invention.
Figure 5:
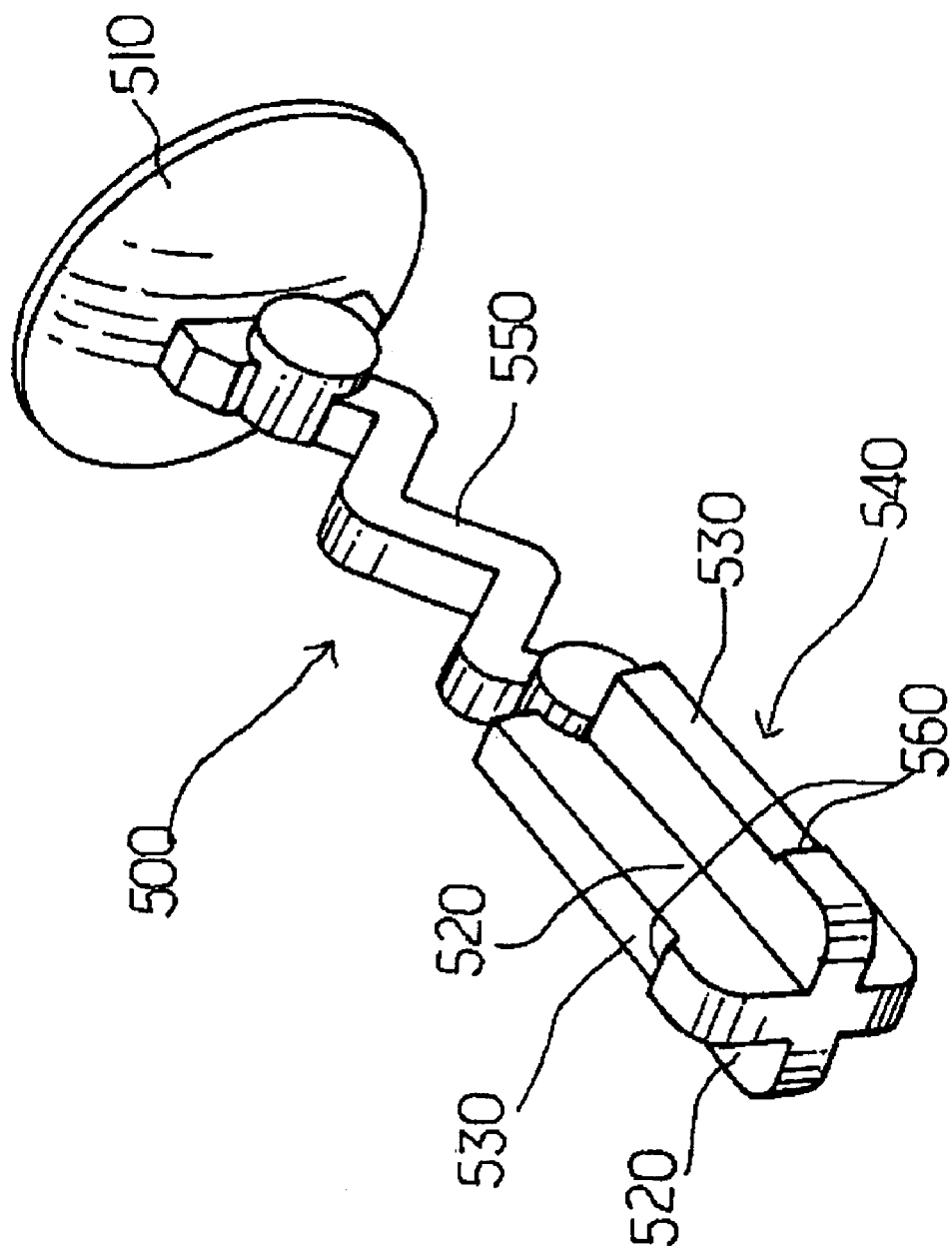
FIG. 5 is a perspective view of a nozzle hole opening and closing member, which is another principal component of the present invention.

FIG. 2 is a longitudinal sectional view illustrating the nozzle button 30 fully lowered to discharge the contents. When the nozzle button 30 is lowered, the piston shaft 50 is also lowered. Consequently, the pumping piston 52 is lowered, by which the interior pressure of the cylinder 61 is increased. As a result, the contents received in the cylinder 61 are introduced into the contents communication hole 51 of the piston shaft 50 due to the pressure of the pumping piston 52. At this time, the opening and closing part 71 of the second valve rod 70 is raised with the result that the contents are discharged through the liquid channels 520 formed at the cross-shaped plate member 530 of the nozzle hole opening and closing member 500. Consequently, the opening and closing plate 510, which is now closing the nozzle hole 31, is moved outward due to the discharge pressure of the contents. As a result, the nozzle hole 31 is opened, and therefore, the contents are discharged through the nozzle hole 31. When the nozzle button 30 is pressed, the second valve rod support rib 34 presses the upper end of the second valve rod 70. As a result, the second valve rod 70 is lowered along with the piston shaft 50. As a result, the support surface 311 of the contents opening and closing member 310 of the first valve member 300 is pressed by the lower end of the second valve rod 70. Consequently, the sealability between the contents opening and closing member 310 and the contents introduction hole 64 is further increased, and therefore, the contents in the contents receiving vessel 40 are prevented from being introduced into the cylinder 61.

The first valve member location part 200 is disposed at the inner bottom surface of the cylinder 61, and the protruding rim 210 is disposed above the first valve member location part 200. Consequently, when the first valve member 300 is located in the first valve member location part 200, the separation preventing protrusion 330 formed at the outer circumference wall of the first valve member 300 is fitted into the lower part of the protruding rim 210. As a result, the first valve member 300 is fixedly secured, and therefore, the first valve member 300 is prevented from being separated from the first valve member location part 200. In this state, the contents opening and closing member 310 performs the opening and closing operation at a fixed position. While the nozzle button is raised due to the elasticity of the elastic flat plate part 340 holding the contents opening and closing member 310, the contents opening and closing member 310 always closes the contents introduction hole 64. Consequently, the leakage prevention effect is increased. Furthermore, it is possible to eliminate the problem that the contents introduction hole is not rapidly closed by the first valve member when the viscosity of the contents is high as in the related art.

In addition, the friction ribs 321 formed at the opposite sides of the upper part of the vertical guide rod 320, which is fitted in the guide hole 410 of the second valve rod 70, have appropriate elasticity. Consequently, when the second valve rod 70 is raised while the friction ribs 321 are fitted in the guide hole 410, the contents opening and closing member 310 is raised by the friction ribs 321 due to appropriate friction between the friction ribs 321 and the inner wall of the guide hole 410. When the second valve rod 70 is lowered, on the other hand, the friction ribs 321 push the second valve rod 70 at appropriate pressure. Consequently, the sealability between the second valve rod 70 and the contents introduction hole 64 is increased.

The quantified contents discharging support protrusion 100 is disposed at the lower part of the contents communication hole 51 of the piston shaft 50. Consequently, when the quantified contents discharging support protrusion 100 is brought into contact with the upper end of the first valve member 300 as the piston shaft 50 is lowered, the downward movement of the piston shaft 50 is stopped. As a result, the lowering distance of the pumping piston 52 is uniformly maintained, and therefore, the amount of the discharged contents is uniformly maintained.

In addition, the fitting part 400, which is disposed at the lower part of the second valve rod 70, is fitted in the holder part 360 of the first valve member 300. Consequently, the second valve rod 70 is prevented from being separated from the first valve member 300. Also, the guide rod 320, which is integrally formed with the contents opening and closing member 310, is fitted in the guide hole 410, which is formed in the lower part of the second valve rod 70. Consequently, the second valve rod 70 performs the upward and downward movement, while the vertical state of the second valve rod 70 is maintained, thereby smoothly accomplishing the opening and closing operation.

The fixing part 540, which is positioned at the inside part of the nozzle hole opening and closing member 500, has the cross-shaped plate member 530, and the assembly fixing protrusion 560 is formed at the circumferential wall of the plate member 530. Consequently, when the nozzle hole opening and closing member 500 is fitted in the nozzle hole 31 of the nozzle button 30, the assembly fixing protrusion 560 is caught by the step part 32 formed at the inner surface of the nozzle hole 31. As a result, the nozzle hole opening and closing member 500 is prevented from being separated from the nozzle hole 31 of the nozzle button 30. Also, the opening and closing plate 510 and the fixing part 540 are connected with each other via the wave-shaped elastic contraction part 550. Consequently, the nozzle hole 31 is always closed by the opening and closing plate 510 due to the contracting force of the elastic contraction part 550. When the pressure is applied to the nozzle hole opening and closing member 500 to such an extent that the contents can be discharged through the nozzle hole 31, the elastic contraction part 550 extends. As a result, the opening and closing plate 510 is moved outward, whereby the nozzle hole 31 is opened.

In the airless type cosmetic container according to the present invention, the first valve member 300 is fixed. As a result, when no pumping operation is performed, i.e., when the nozzle button 30 is raised, the contents introduction hole 64 is always closed by the contents opening and closing member 310, the contents communication hole 51 of the piston shaft 50 is closed by the opening and closing part 71 of the second valve rod 70, and the nozzle hole 31 is closed by the opening and closing plate 510 of the nozzle hole opening and closing member 500. Consequently, the airless type cosmetic container according to the present invention has the effect of preventing the introduction of external air or foreign matter due to the aforementioned triple blocking structure. Furthermore, even when impacts are applied to the contents receiving vessel or the contents receiving vessel is shaken, the first valve member, the second valve member, and the contents opening and closing member 310 are not shaken, whereby the outflow or backward-flow of the contents is not effectively prevented.

After the contents are discharged, the housing member 60 is lowered in the contents receiving vessel by the amount of contents discharged from the contents receiving vessel, whereby the interior of the contents receiving vessel is always maintained airless.

As apparent from the above description, the operation of the second valve rod is smoothly performed, and the lowering distance of the piston shaft is uniformly maintained. Consequently, the present invention has the effect of discharging a fixed quantity of contents. Furthermore, the sealability between the first valve member and the nozzle hole opening and closing member is very high, thereby fundamentally preventing the introduction of external air or foreign matter. Consequently, the present invention has the effect of preventing the decomposition or the acidification of the contents.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An airless type cosmetic container with quantified contents discharging, contents leakage preventing and contents deterioration preventing functions, the airless type cosmetic container comprising a nozzle button, the nozzle button having a nozzle hole, through which contents are discharged, the nozzle hole being provided with a step part formed at the inner surface thereof, a piston shaft connection part disposed in the central part thereof, and a second valve rod support rib also disposed in the central part thereof, a contents receiving vessel, in the upper part of which the nozzle button is fitted, and a piston shaft fixedly fitted in the piston shaft connection part, the piston shaft having a contents communication hole defined therein and a pumping piston integrally formed at the lower part thereof, a housing member, the housing member having a cylinder, in which the pumping piston is fitted, a contents sealing rib formed at the circumferential wall of the lower part of the cylinder, a plurality of vertical reinforcing ribs formed at the outer circumferential wall of the cylinder, and a contents introduction hole formed in the bottom surface of the cylinder, a second valve rod fitted in the contents communication hole of the piston shaft, the second valve rod having a tapered opening and closing part formed at the upper part thereof, and a nozzle button return spring disposed between the housing member and the nozzle button, wherein the airless type cosmetic container further comprises a quantified contents discharging support protrusion disposed at the inner surface of the lower part of the contents communication hole of the piston shaft, a first valve member location part disposed at the inner bottom surface of the cylinder of the housing member, a first valve member fixed to the first valve member location part, the first valve member being integrally formed with a contents opening and closing member having a support surface formed at the upper part thereof and a vertical guide rod having friction ribs protruding from the circumferential wall of the upper part thereof in opposite directions, a fitting part disposed at the lower part of the second valve rod, the fitting part is fitted in the first valve member in such a manner that the fitting part cannot be separated from the first valve member, a catching part disposed at the lower part of the fitting part, a guide hole, in which the vertical guide rod is fitted, and a nozzle hole opening and closing member fitted in the nozzle hole of the nozzle button, the nozzle hole opening and closing member having a contents opening and closing function.

2. The airless type cosmetic container according to claim 1, wherein the nozzle button is provided at the inner surface thereof with a housing assembly protrusion.

3. The airless type cosmetic container according to claim 1, wherein the housing member is provided at the upper ends of the vertical reinforcing ribs formed at the outer circumferential wall thereof with a nozzle button assembly ring, which is integrally formed with the vertical reinforcing ribs, the nozzle button assembly ring having an inclined outer circumferential wall and a catching protrusion.

4. The airless type cosmetic container according to claim 1, wherein the first valve member location part is provided with a protruding rim.

5. The airless type cosmetic container according to claim 1, wherein the first valve member includes a separation preventing protrusion formed at the outer circumference wall thereof.

6. The airless type cosmetic container according to claim 1, wherein the first valve member includes an elastic flat plate part for holding the contents opening and closing member.

7. The airless type cosmetic container according to claim 6, wherein the elastic flat plate part is provided with a plurality of contents communication holes.

8. The airless type cosmetic container according to claim 1, wherein the first valve member includes a contents discharge channel formed in the circumferential wall of a member body thereof.

9. The airless type cosmetic container according to claim 1, wherein the first valve member includes a holder part formed at the upper end thereof for holding the fitting part of the second valve rod.

10. The airless type cosmetic container according to claim 1, wherein the nozzle hole opening and closing member includes an arc-shaped opening and closing plate, a fixing part having a cross-shaped plate member formed with a plurality of liquid channels, an elastic contraction part, and an assembly fixing protrusion.

* * * * *